Figure 1:
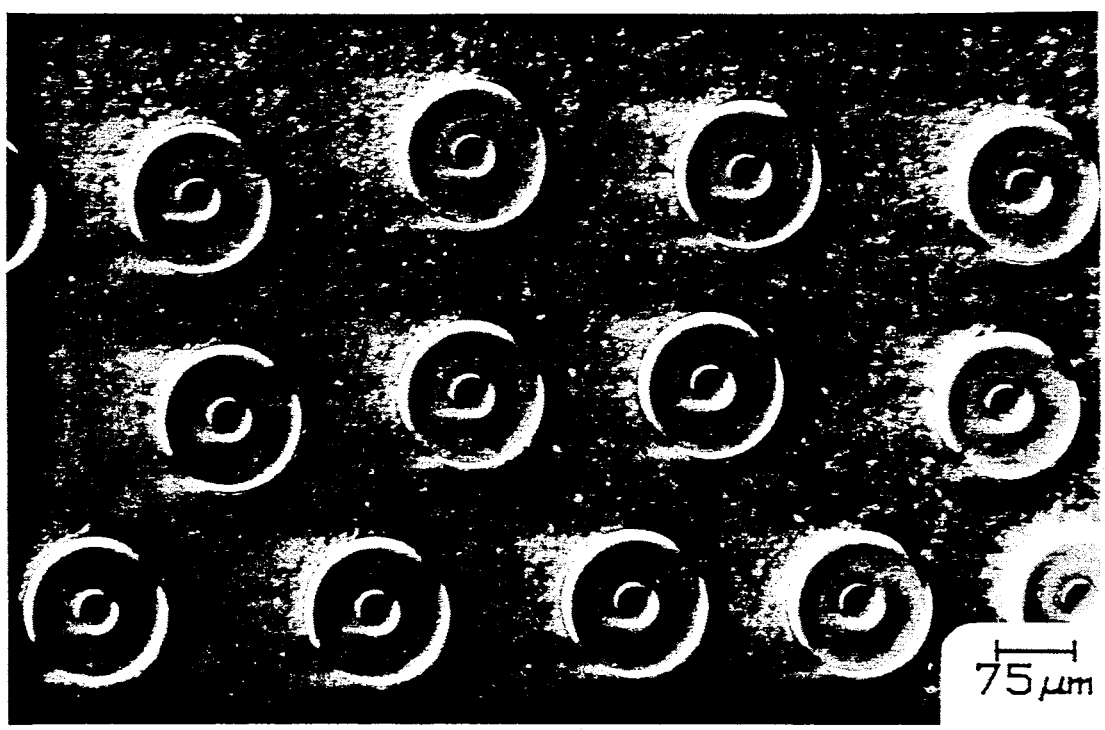

United States Patent [19]

Singh et al.

[11] Patent Number: 5,067,998

[45] Date of Patent: * Nov. 26, 1991

[54] FIBROUS MATERIAL-CONTAINING COMPOSITE

[75] Inventors: Raj N. Singh, Schenectady; Achuta R. Gaddipati, Scotia, both of N.Y.

[73] Assignee: General Electric Company, Schenectady, N.Y.

[*] Notice: The portion of the term of this patent subsequent to Jun. 5, 2007 has been disclaimed.

[21] Appl. No.: 448,643

[22] Filed: Dec. 11, 1989

Related U.S. Application Data

[60] Continuation-in-part of Ser. No. 359,609, Jun. 1, 1989, abandoned, which is a division of Ser. No. 135,858, Dec. 21, 1987, Pat. No. 4,931,311.

[51] Int. Cl.$^5$ .................... C04B 35/80; C04B 35/84; B32B 18/00; B32B 31/20
[52] U.S. Cl. ...................... 156/89; 156/178; 156/179; 156/181; 428/110; 428/113; 428/114; 428/294; 428/698; 501/95
[58] Field of Search .............. 428/110, 113, 114, 408, 428/698, 294; 501/95; 156/89, 178, 179, 181

[56] References Cited

U.S. PATENT DOCUMENTS

| | | | |
|---|---|---|---|
| 3,575,789 | 4/1971 | Siefert et al. | 501/95 |
| 4,341,965 | 7/1982 | Okuo et al. | 501/95 |
| 4,588,699 | 5/1986 | Brennan et al. | 428/698 |
| 4,610,917 | 9/1986 | Yamamura et al. | 428/408 |
| 4,618,529 | 10/1986 | Yamamura et al. | 428/408 |
| 4,636,480 | 1/1987 | Hillig . | |
| 4,640,899 | 2/1987 | Hillig . | |
| 4,642,271 | 2/1987 | Rice | 428/698 |
| 4,725,567 | 2/1988 | Hillig . | |
| 4,737,476 | 4/1988 | Hillig . | |
| 4,748,079 | 5/1988 | Thebault | 428/408 |
| 4,752,503 | 6/1988 | Thebault | 427/248.1 |
| 4,769,349 | 9/1988 | Hillig et al. . | |
| 4,781,993 | 11/1988 | Bhatt | 428/408 |
| 4,788,162 | 11/1988 | Hillig . | |
| 4,808,076 | 2/1989 | Jarmon et al. | 501/95 |
| 4,810,442 | 5/1989 | Hillig et al. . | |
| 4,915,760 | 4/1990 | Singh et al. | 156/89 |

FOREIGN PATENT DOCUMENTS 0209320 1/1987 European Pat. Off. .

OTHER PUBLICATIONS

Abstract (20–C–87C) "Effect of Boron Nitride Coating on Fiber-Matrix Interactions", R. N. Singh & M. K. Brun, Ceramics Bulletin, vol. 65, No. 11, Nov. 1986.
R. N. Singh and M. K. Brun, "Effect of Boron Nitride Coating on Fiber-Matrix Interactions" (87 CRD 051) (Apr. 1987) 12 pages.
R. N. Singh and A. R. Gaddipati, "Mechanical Properties of a Uniaxially Reinforced Mullite-Silicon Carbide Composite" (87 CRD 120) (Jun. 1987) 14 pages.
M. K. Brun and R. N. Singh, "Effect of Thermal Expansion Mismatch and Fiber Coating on the Fiber/Matrix Interfacial Shear Stress in CMCs" (87 CRD 139) (Jul. 1987) 13 pages.
R. N. Singh, "Role or Fiber-Matrix Interfacial Shear Stress on the Toughness of Reinforced Oxide Matrix Composites" (88 CRD 129) (Apr. 1988) 9 pages.

*Primary Examiner*—James C. Cannon
*Attorney, Agent, or Firm*—James Magee, Jr.; James C. Davis, Jr.

[57] ABSTRACT

A composite is produced by admixing a matrix-forming material with organic binding material, forming the resulting mixture into a tape, disposing a layer of boron nitride coated fibrous material between at least two of the tapes to form a layered structure, laminating the layered structure, heating the layered structure to remove organic binding material and hot pressing the resulting porous structure to form a composite.

19 Claims, 3 Drawing Sheets

FIBROUS MATERIAL-CONTAINING COMPOSITE

This is a Continuation-In-Part of U.S. application Ser. No. 359,609, filed June 1, 1989, now abandoned, which is a Division of Ser. No. 135,858, filed Dec. 21, 1987 now U.S. Pat. No. 4,931,311.

This application is related to: Ser. No. 056,516, filed June 1, 1987, for Borom et al., now U.S. Pat. No. 5,015,540, Ser. No. 100,806, filed Sept. 24, 1987, Ser. No. 132,753, filed Dec. 14, 1987, now U.S. Pat. No. 4,886,682, Ser. No. 216,488 (U.S. Pat. No. 4,944,904) and Ser. No. 216,471, filed July 8, 1988, Ser. No. 290,552, filed Dec. 27, 1988, Ser. No. 262,651, filed Oct. 26, 1988, now U.S. Pat. No. 4,915,760 Ser. No. 748,420, filed Dec. 8, 1989, Ser. No. 260,201, filed Oct. 20, 1988, Ser. No. 311,801, filed Feb. 17, 1989, now U.S. Pat. No. 4,889,686, Ser. No. 322,849, filed Mar. 14, 1989, now abandoned, Ser. No. 396,391, filed Aug. 21, 1989, now U.S. Pat. No. 4,981,822, Ser. No. 07/437,155, filed Nov. 3, 1989, all for Singh et. al.; and Ser. No. 07/429,430, filed Oct. 31, 1989 for Singh.

The referenced applications are directed to the production of fiber-containing ceramic composites. They are assigned to the assignee hereof and are incorporated herein by reference.

Ser. No. 07/437,155, filed Nov. 3, 1989, which is a Continuation-In-Part of Ser. No. 322,849, filed Mar. 14, 1989, for FIBROUS MATERIAL-CONTAINING COMPOSITE, R. N. Singh and A. R. Gaddipati, discloses admixing a matrix-forming material with organic binding material, forming the resulting mixture into a tape, disposing a layer of fibrous material between the tapes to form a layered structure, laminating the layered structure, heating the layered structure to remove organic binding material and hot pressing the resulting porous structure to form a composite.

The present invention is directed to producing a boron nitride coated fiber-reinforced ceramic matrix composite. In a preferred embodiment, the present invention is directed to producing a boron nitride coated filament-reinforced ceramic matrix composite.

Fiber reinforcement of brittle ceramic materials offers significant opportunities for toughening of the brittle matrix. For this reason, ceramic matrices are being incorporated into fiber preforms for the fabrication of ceramic matrix composites. Several techniques for incorporating the ceramic matrix into a fiber preform have been tried. These are: filament-winding through a slurry of the matrix material, chemical vapor infiltration and sol-gel infiltration techniques. In passing a filament winding through a slurry of the matrix, relatively small amounts of the matrix adhere to the filaments. Chemical vapor infiltration and sol-gel infiltration techniques are slow. Conventional ceramic processing techniques such as slip casting and/or vacuum casting techniques followed by hotpressing do not provide good penetration of the matrix material between the reinforcing fiber preforms thereby leaving large voids in the preform. These difficulties are overcome by the present invention.

In a preferred embodiment, the present process comprises depositing boron nitride coating on filaments, forming substantially uniaxially aligned preforms of the coated filaments, tape casting of the matrix-forming material, laminating the coated filament preforms between ceramic tapes, binder burn-out of the laminated structure, and hot-pressing for consolidation.

Figure 2:
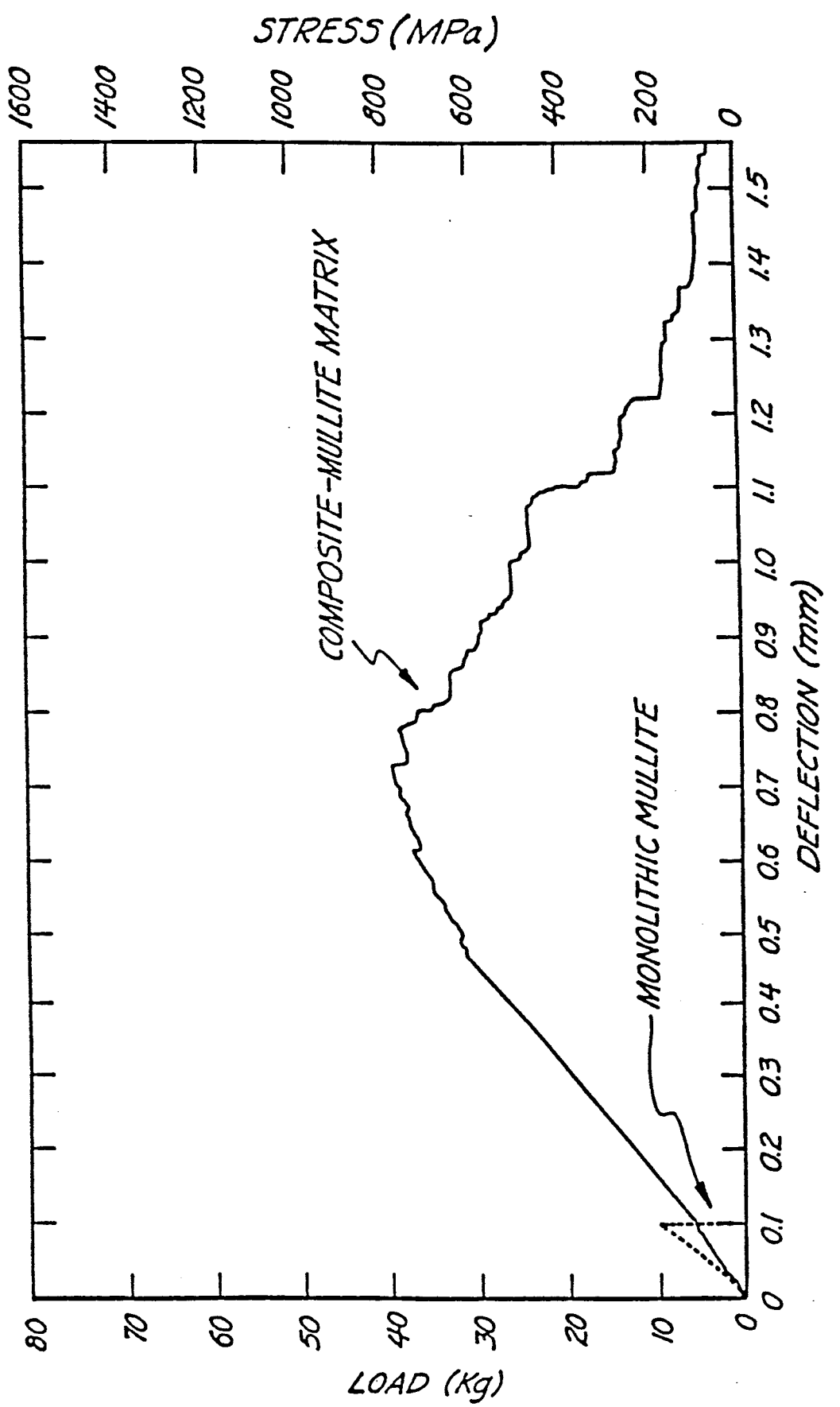
Figure 3:
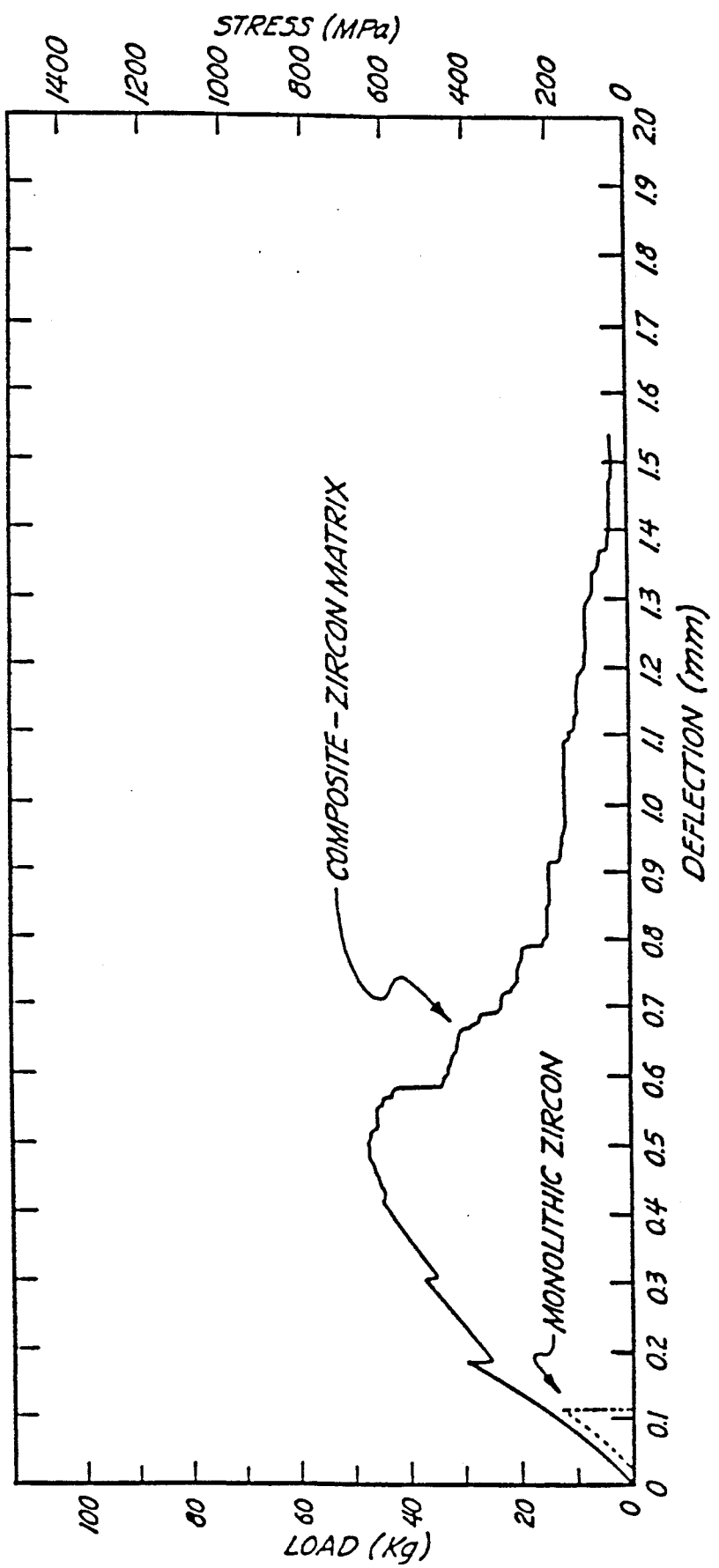

Those skilled in the art will gain a further and better understanding of the present invention from the detailed description set forth below, considered in conjunction with the accompanying figures which form a part of the specification wherein:

FIG. 1 shows a cross-section (perpendicular to the axis of the layers of boron nitride coated filaments) of the present composite;

FIG. 2 shows a graph (continuous line) illustrating the load deflection behavior of the present composite having a mullite matrix, and another graph (broken line) illustrating the load deflection behavior of a monolithic hot pressed body of mullite; and FIG. 3 shows a graph (continuous line) illustrating the load-deflection behavior of the present composite having a zircon matrix, and another graph (broken line) illustrating the load deflection behavior of a monolithic hot pressed body of zircon.

Briefly stated, one embodiment of the present process for producing a composite containing at least a layer of boron nitride coated fibrous material embedded in a ceramic matrix comprises:

(a) providing matrix-forming ceramic material;

(b) admixing said matrix-forming material with an organic binding material;

(c) forming the resulting mixture into tape;

(d) depositing a coating of boron nitride on fibrous material leaving no significant portion thereof exposed;

(e) disposing a layer of said coated fibrous material between the faces of two of said tapes forming a layered structure;

(f) laminating the layered structure to form a laminated structure;

(g) heating said laminated structure to remove said organic binding material leaving no significant deleterious residue; and (h) hot pressing the resulting porous structure at a sufficient temperature under a sufficient pressure for a sufficient period of time to consolidate said structure to produce said composite having a porosity of less than about by volume, said composite containing no significant amount of reaction product of said coated fibrous material and said matrix, said matrix having a thermal expansion coefficient which is less than about 15% higher than that of said coated fibrous material, at least about 10% by volume of said composite being comprised of coated fibrous material.

Briefly stated, in another embodiment, the present process produces a composite containing at least a layer of spaced, substantially parallel boron nitride coated filaments embedded in a ceramic matrix which comprises:

(a) providing matrix-forming ceramic material;

(b) admixing said matrix-forming material with an organic binding material;

(c) forming the resulting mixture into tape;

(d) depositing a coating of boron nitride on a filament leaving no significant portion thereof exposed, said filament having a diameter of at least about 50 microns and a length at least about 10 times its diameter;

(e) forming a plurality of said boron nitride coated filaments into a layer wherein said coated filaments are spaced from each other and at least substantially parallel to each other;

(f) disposing said layer of coated filaments between the faces of two of said tapes forming a layered structure;

(g) laminating the layered structure to form a laminated structure;

(h) heating said laminated structure to remove said organic binding material leaving no significant deleterious residue; and (i) hot pressing the resulting porous structure at a sufficient temperature under a sufficient pressure for a sufficient period of time to consolidate said structure to produce said composite having a porosity of less than about 5% by volume, said composite containing no significant amount of reaction product of said coated filaments and said matrix, said matrix having a thermal expansion coefficient which is less than about 15% higher than that of said coated filaments, at least about 10% by volume of said composite being comprised of spaced coated filaments.

As used herein, the word "tape" includes sheet.

As used herein, "fibrous material" includes fibers, chopped fibers, filaments, continuous filaments, strands, bundles, whiskers, cloth, felt, and any combinations thereof.

In a preferred embodiment, the fibrous material is comprised of a plurality of filaments, preferably continuous filaments, which are spaced from each other. Preferably, the filaments in each layer are at least substantially parallel to each other.

In one embodiment, the present filament has a diameter of at least about 50 microns. Generally, the diameter of the filament ranges from about 50 microns to about 250 microns, frequently from about 70 microns to about 150 microns, or from about 100 microns to about 150 microns. The filament is continuous and can be as long as desired. It has a minimum length of at least about 10 times its diameter, and generally, it is longer than about 1,000 microns, or it is longer than about 2,000 microns.

In one embodiment utilizing spaced filaments with a diameter of at least about 50 microns, the minimum diameter of the filament depends largely on the minimum spacing required between the boron nitride coated filaments through which the matrix forming ceramic particulate material must penetrate and is determinable empirically. For a given volume fraction of coated filaments, as the diameter of the coated filament decreases, the total amount of space between coated filaments decreases making it more difficult for the matrix-forming ceramic to penetrate the space. As a result, the present invention enables the production of a composite with a high volume fraction of uniaxially aligned spaced continuous coated filaments not attainable with filaments of smaller diameter. Generally, filaments having a diameter of less than about 50 microns are not useful in the present invention because they may not be practical to use or they may be inoperable for producing composites with a desired high volume fraction of filaments.

Preferably, the present fibrous material or filament has in air at ambient or room temperature, i.e. from about 15° C. to about 30° C., a minimum tensile strength of about 100,000 psi, and a minimum tensile modulus of about 25 million psi.

In the present invention, the fibrous material or filaments can be amorphous, crystalline or a mixture thereof. The crystalline fibrous material or filaments can be single crystal and/or polycrystalline. In one embodiment, the fibrous material is a carbon-containing material which contains carbon in an amount of at least about 1% by weight, frequently at least about 5% by weight, of the fibrous material. In another embodiment, the fibrous material or filament is selected from the group consisting of aluminum oxide, elemental carbon, a silicon carbide-containing material, a silicon nitride-containing material, and combinations thereof. Preferably, the silicon carbidecontaining material contains at least about 50% by weight of silicon and at least about 25% by weight of carbon, based on the weight of the material. Examples of silicon carbidecontaining materials are silicon carbide, Si—C—O, Si—C—O—N, Si—C—O—Metal, and Si—C—O—N—Metal, where the Metal component can vary but frequently is Ti or Zr. Preferably, the silicon nitride-containing material contains at least about 50% by weight of silicon and at least about 25% by weight of nitrogen, based on the weight of the silicon nitridecontaining material. Examples of silicon nitride-containing materials are silicon nitride, Si-N-O, Si-C-O-N, Si-N-O-Metal, and Si-C-O-N-Metal, where the metal component can vary but frequently is Ti or Zr. There are processes known in the art which use organic precursors to produce fibrous material, preferably filaments, which may introduce a wide variety of elements into the fibrous material.

As used herein, fibrous material or filaments of "elemental carbon" or "carbon" includes all forms of elemental carbon including graphite.

Reference herein to fibrous material or filaments of silicon carbide includes, among others, presently available materials wherein silicon carbide material envelops a core, and which generally are produced by chemical vapor deposition of silicon carbide on a core such as, for example, elemental carbon or tungsten.

In carrying out the present process, boron nitride is coated on the fibrous material or filament to produce a coating thereon which leaves at least no significant portion thereof exposed, and preferably, the entire fibrous material or filament is coated with boron nitride. Preferably, the entire wall of each individual filament is totally coated with boron nitride leaving none of the wall exposed. The ends of the filament may be exposed but such exposure is not considered significant. The boron nitride coating should be continuous, free of any significant porosity and preferably it is pore-free. Preferably, the boron nitride coating is of uniform or at least significantly uniform thickness.

The boron nitride coating can be deposited on the fibrous material, preferably filament, by a number of known techniques under conditions which have no significant deleterious effect thereon. Generally, the boron nitride coating can be deposited by chemical vapor deposition by reactions such as:

  (1)

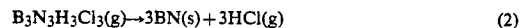  (2)

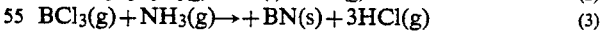  (3)

Generally, the chemical vapor deposition of boron nitride is carried out at temperatures ranging from about 900° C. to 1,800° C. in a partial vacuum, with the particular processing conditions being known in the art or determinable empirically.

The boron nitride coating should be at least sufficiently thick to be continuous and free of porosity, or free of significant porosity. However, the coating is sufficiently thin so that the thermal expansion coefficient of the boron nitride coated fibrous material, preferably filament, is the same as, or not significantly different from, that of the uncoated fibrous material or filament.

Generally, the thickness of the coating ranges from about 0.3 microns to about 5 microns, and typically it is about 0.5 microns. The particular thickness of the coating is determinable empirically, i.e. it should be sufficient to prevent reaction, or prevent significant reaction, between the fibrous material, preferably filament, and the matrix-forming material under the particular processing conditions used or under the particular conditions of use of the resulting composite. In the present invention, the boron nitride coating bars contact, or bars significant contact, between the fibrous material, preferably filaments, and the matrix-forming material or matrix.

In one embodiment, the matrix-forming material is comprised of ceramic particulates. These particulates are inorganic, crystalline or polycrystalline, and in the present process, they are consolidated, i.e. they undergo solid state sintering, to produce the present solid composite. The matrix-forming particulates can be comprised of an oxidebased ceramic such as, for example, aluminum oxide, mullite, zircon, and combinations thereof. Other suitable matrix-forming materials are silicon carbide and silicon nitride and combinations thereof. The particulates are of a size which can penetrate between the coated fibrous material or filaments. Generally, they have a specific surface area ranging from about 0.2 to about 10 meters$^2$ per gram, and frequently, ranging from about 2 to about 4 meters$^2$ per gram.

In another embodiment of the present invention, the matrix-forming material is comprised of a mixture of the ceramic particulates and whiskers to produce a matrix with significantly increased toughness. The whiskers are crystalline, inorganic and stable in the present process. Preferably, the whiskers are comprised of silicon carbide or silicon nitride. Preferably, the whiskers are of a size which can penetrate between the coated fibrous material, preferably filaments. Generally, they are less than about 50 microns in length and less than about 10 microns in diameter. Generally, the whiskers range up to about 30% by volume, frequently up to about 10% by volume, of the matrix-forming material.

In the present invention, the matrix-forming material, or matrix in the composite, has a thermal expansion coefficient ranging from lower than that of the coated fibrous material, preferably filaments, to less than about 15% higher than that of the coated fibrous material, preferably filaments. For example, depending on such factors as filament size, alignment of the filaments and the particular processing conditions, a matrix-forming material with a thermal expansion coefficient about 15% or more higher than that of the coated filaments may result in a matrix with significantly deleterious cracks which would render the composite useless. Preferably, for optimum mechanical properties of the composite, the matrix-forming material, or matrix, has a thermal expansion coefficient ranging from less than to about the same as that of the coated fibrous material, preferably filaments.

In the present process, the components forming the composite, i.e. boron nitride coated fibrous material and matrix-forming material, are solid. Also, there is no significant amount of reaction product formed, or preferably no reaction product detectable by scanning electron microscopy, between the components of the matrix-forming material, or between the matrix-forming material, or matrix, and coated fibrous material, preferably filaments.

The organic binding material used in the present process bonds the particulates, or particulates and whiskers, together and enables formation of the required thin tape of desired solids content. By solids content, it is meant herein the content of matrix-forming material. The organic binding material thermally decomposes at an elevated temperature ranging to below about 800° C., generally from about 50° C. to below about 800° C., and preferably from about 100° C., to about 500° C., to gaseous product of decomposition which vaporizes away leaving no significant deleterious residue, and may leave a minor amount, not significant, of elemental carbon.

The organic binding material is a thermoplastic material with a composition which can vary widely and which is well-known in the art or can be determined empirically. Besides an organic polymeric binder, it can include an organic plasticizer therefor to impart flexibility. The amount of plasticizer can vary widely depending largely on the particular binder used and the flexibility desired, but typically, it ranges up to about 50% by weight of the total organic content. Preferably, the organic binding material is soluble in a volatile solvent.

Representative of useful organic binders are polyvinyl acetates, polyamides, polyvinyl acrylates, polymethacrylates, polyvinyl alcohols, polyvinyl butyrals, and polystyrenes. The useful molecular weight of the binder is known in the art or can be determined empirically. Ordinarily, the organic binder has an average molecular weight at least sufficient to make it retain its shape at room temperature and generally such an average molecular weight ranges from about 20,000 to about 200,000, frequently from about 30,000 to about 100,000.

Representative of useful plasticizers are dioctyl phthalate, dibutyl phthalate, diisodecyl glutarate, polyethylene glycol, and glycerol trioleate.

In carrying out the present process, the matrix-forming material and organic binding material are admixed to form a uniform or at least a substantially uniform mixture or suspension which is formed into a tape of desired thickness and solids content. A number of conventional techniques can be used to form the mixture and resulting green tape. Generally, the components are milled in an organic solvent in which the organic material is soluble or at least partially soluble to produce a castable mixture or suspension. Examples of suitable solvents are methyl ethyl ketone, toluene, and alcohol. The mixture or suspension is then cast into a tape of desired thickness in a conventional manner, usually by doctor blading which is a controlled spreading of the mixture or suspension on a carrier from which it can be easily released such as Teflon. The cast tape is dried to evaporate the solvent therefrom to produce the present tape which is then removed from the carrier.

The particular amount of organic binding material used in forming the mixture is determinable empirically and depends largely on the amount and distribution of solids desired in the resulting tape. Generally, the organic binding material ranges from about 25% by volume to about 50% by volume of the solids content of the tape.

The present tape or sheet can be as long and as wide as desired, and generally it is of uniform or substantially uniform thickness. Its thickness depends largely on the volume fraction of coated fibrous material, preferably filaments, which must be accommodated and is determinable empirically. The tape should be at least sufficiently thick to contain an amount of matrix-forming material required in the present process to produce the composite. Generally, with increasing volume fractions of coated fibrous material, preferably filaments, correspondingly smaller amounts of matrix-forming material would be required. Generally, the tape has a thickness ranging from about 25 microns (0.001 inch) to about 1,300 microns (0.052 inch), frequently ranging from about 125 microns (0.005 inch) to about 1,000 microns (0.040 inch), and more frequently ranging from about 250 microns (0.01 inch) to about 500 microns (0.02 inch).

Generally, in carrying out the present process, a layer of the coated fibrous material is placed between, i.e. intermediate, two tapes, i.e. between the faces of the tapes, to form a layered structure, i.e. preferably substantially a sandwich structure. The layer of coated fibrous material can be continuous or discontinuous and it contains sufficient spacing to permit production of the present composite. Preferably, there is a sufficient spacing in the layer between the fibers, filaments, strands, bundles, or whiskers to enable the tapes to flow therebetween sufficiently during lamination of the layered structure to produce the present composite. The extent of spacing in the layer of coated fibrous material is determined empirically and depends largely on the size of the matrix-forming ceramic particulates and the particular composite desired.

Generally, in a preferred embodiment of carrying out the present process, a preform comprised of a layer of the boron nitride coated filaments which are spaced from each other and which are parallel, or at least substantially parallel, to each other is used. The minimum space between the coated filaments should be at least sufficient to enable the matrix-forming ceramic particulates, preferably the matrix-forming material, to penetrate therebetween, and generally, it is at least about 50 microns, and frequently at least about 100 microns. Generally, the spacing between coated filaments in a single layer is substantially equivalent, or if desired, it can vary. Coated filament loading in the composite can be varied by changing the spacing between the coated filaments and/or tape thickness.

The preform of coated filaments can be produced by a number of conventional techniques. For example, the coated filaments can be uniaxially aligned and spaced by placing them in a suitable device provided with grooves and the desired spacing. The layer of coated filaments can be lifted off the device with adhesive tape placed across both ends of the filaments. The taped end portions of the coated filaments can eventually be cut away from the laminated structure.

A layer of boron nitride coated filaments is placed between, i.e. intermediate, two tapes, i.e. between the faces of the tapes, to form a layered structure, i.e. preferably substantially a sandwich structure.

A plurality of layers of coated fibrous material, preferably filaments, can be used in forming the layered structure provided the layers are separated from each other by a tape. Preferably, all of the tapes in the layered structure are at least substantially coextensive with each other.

In one embodiment, before assembly of the layered structure, a solution of the present organic binder in organic solvent is sprayed on the faces of the tapes to be contacted with the coated fibrous material or filaments, dried to evaporate the solvent and leave a sticky film of organic binder to enhance adhesion. The concentration of organic binder in solution can vary widely and generally ranges from about 1% by weight to about 10% by weight of the solution. The solution is sprayed on the face of the tape for a period of time, determinable empirically, so that on evaporation of the solvent sufficient sticky binder remains to significantly enhance adhesion or facilitate bonding of the tapes. Preferably, drying is carried out in air at ambient temperature in less than a minute, and typically, in a few seconds. The deposited binder can be a continuous or discontinuous coating, and typically, 0.2 milligrams of sticky binder per square centimeter of surface is adequate.

The layered structure is then laminated under a pressure and temperature determinable empirically depending largely on the particular composition of the organic binding material to form a laminated structure. Lamination can be carried out in a conventional manner. Laminating temperature is determinable empirically and should be below the temperature at which there is decomposition, or significant decomposition, of organic binding material and generally, an elevated temperature below 150° C. is useful and there is no significant advantage in using higher temperatures. Typically, the lamination temperature ranges from about 35° C. to about 95° C. and the pressure ranges from about 500 psi to about 3,000 psi. Generally, lamination time ranges from about ½ to about 5 minutes. Also, generally, lamination is carried out in air.

If desired, the laminated structure can be cut to desired dimensions by suitable means such as a diamond saw.

The laminated structure is heated to thermally decompose the organic binding material producing a porous structure comprised of the coated fibrous material, preferably filaments, and matrix-forming material. The rate of heating depends largely on the thickness of the sample and on furnace characteristics. At a firing temperature ranging up to about 500° C., a slower heating rate is desirable because of the larger amounts of gas generated at these temperatures by the decomposition of the organic binding material. Typically, the heating rate for a sample of less than about 6 millimeters (6000 microns) in thickness can range from about 15° C. per hour to about 30° C. per hour. At a temperature of less than about 800° C., thermal decomposition is completed leaving no significant deleterious residue. Frequently, thermal decomposition of the organic binding material leaves a residue of elemental carbon in the matrix-forming material generally ranging from an amount detectable by scanning electron microscopy to less than about 0.1% by volume, or less than about 0.05% by volume, of the total volume of the resulting porous structure.

Thermal decomposition can be carried out in any atmosphere, preferably at or below atmospheric pressure, which has no significant deleterious effect on the sample such as, for example, argon. Preferably, thermal decomposition is carried out in a partial vacuum to aid in removal of gases.

The resulting porous structure is hot pressed at a sufficient temperature under a sufficient pressure for a sufficient period of time to Consolidate the structure to produce the present composite. The particular pressure, temperature, and time are determinable empirically and are interdependent. Hot pressing temperature can vary depending largely on the characteristics of the matrix-forming material, the applied pressure and hot pressing time. Generally, under higher applied pressures and longer times, lower hot pressing temperatures can be used. Likewise, under lower applied pressures and shorter times, higher hot pressing temperatures would be used. Generally, the hot pressing temperature is at least about 1,400° C., generally ranging from about 1,400° C. to about 1,700° C., frequently from about 1,500° C. to about 1,650° C., and more frequently from about 1,550° C. to about 1,600° C. Generally, temperatures below about 1,400° C. are likely to produce a composite having a porosity greater than about 5% whereas temperatures above about 1,700° C. may coarsen the grains in the product and not affect density.

Generally, hot pressing pressure ranges from higher than about 100 psi to a maximum pressure which is limited by the creep of the sample, i.e. there should be no significant deformation by creep of the sample. Frequently, hot pressing pressure ranges from about 1,000 psi or about 2,000 psi to about 8,000 psi. It is advantageous to use a pressure close to the maximum available because the application of such high pressure makes it possible to keep the pressing temperature low enough to control grain growth. Generally, hot pressing is carried out in a period of time ranging up to about 30 minutes and longer periods of time usually do not provide any significant advantage. Generally, after hot pressing, the sample is furnace cooled to about room temperature before being recovered from the press.

Hot pressing is carried out in a non-oxidizing atmosphere. More particularly, it is carried out in a protective atmosphere in which the material is substantially inert, i.e. an atmosphere which has no significant deleterious effect thereon. Representative of the hot pressing atmospheres is nitrogen, argon, helium or a vacuum. The hot pressing atmosphere generally can range from a substantial vacuum to about atmospheric pressure.

In the present process, there is no loss, or no significant loss, of the components forming the present composite, i.e. boron nitride coated fibrous material or filaments and matrix-forming material.

The present composite is comprised of boron nitride coated fibrous material embedded in a matrix.

In a preferred embodiment, the present composite is comprised of spaced boron nitride coated filaments embedded in and/or within a matrix. The coated filaments can be enveloped by matrix with or without their ends or end portions exposed. The matrix is continuous and interconnecting. It is distributed through the coated filaments and generally it is space filling or substantially completely space filling. Generally, in a preferred embodiment, the matrix envelops or surrounds each boron nitride coated filament, or each coated filament of more than 99% by volume of the coated filaments, embedded therein.

The matrix has a thermal expansion coefficient which ranges from lower than that of the coated fibrous material, preferably filaments, to less than about 15% higher than that of the coated fibrous material, preferably filaments. Preferably, the matrix has a thermal expansion coefficient which is about the same as, or which is lower than, the thermal expansion coefficient of the coated fibrous material, preferably filaments.

The composite may contain a single layer of coated fibrous material, preferably filaments, or a plurality of layers of coated fibrous material or filaments. In a composite containing a plurality of layers of coated fibrous material, preferably filaments, there is no contact between the layers and they are separated by matrix material. Preferably, each layer of coated fibrous material is aligned, or substantially aligned, in a single plane.

In a preferred embodiment, wherein the layer or layers of boron nitride coated fibrous material are comprised of spaced filaments, preferably in each layer more than 99% by volume of the coated filaments, and preferably all or substantially all of the coated filaments, are spaced from each other and parallel or at least substantially parallel, to each other. Preferably, more than 99% by volume, or all, of the coated filaments in each layer are aligned, or substantially aligned, in a single plane. Any misalignment of the coated filaments should not significantly degrade the mechanical properties of the composite.

The coated fibrous material, preferably spaced coated filaments, in a layer or plurality of layers comprise at least about 10% by volume of the composite. Generally, the coated fibrous material, preferably filaments, ranges from about 10% by volume to about 70% by volume, frequently from about 20% by volume to about 60% by volume, or from about 30% by volume to about 50% by volume, of the composite.

The fibrous material, preferably filaments, in the composite are coated with boron nitride which is at least detectable by scanning electron microscopy and generally ranges in thickness from about 0.5 microns to about 1.5 microns. The particular amount of boron nitride in the composite provided by the boron nitride coating depends largely on the amount of coated fibrous material or filaments present, the thickness of the boron nitride coating and the diameter of the fibrous material or filament. Therefore, the volume fraction of boron nitride provided by the coating is the balance of the volume fraction of all other components of the composite. Frequently, however, the boron nitride coating on the fibrous material or filaments in the composite generally ranges from less than about 1% by volume to about 20% by volume, or from about 1% by volume to about 10% by volume, or from about 1% by volume to about 5% by volume, of the total volume of boron nitride-coated fibrous material, preferably filaments. The boron nitride coating can be amorphous, crystalline, or a combination thereof.

The present boron nitride coating optimizes interfacial shear stress between the fibrous material, preferably filaments, and matrix resulting in a composite with a toughness significantly or substantially higher than that of a composite wherein the fibrous material or filaments are uncoated. Specifically, if the matrix and, for example, filaments, were in direct contact, even a slight reaction therebetween would increase interfacial bonding thereby requiring a higher stress to pull out the filaments making the composite less tough. If the interfacial bonding were too high, then the composite would fail in a brittle manner. In contrast, the present boron nitride coating provides an interfacial shear stress which is significantly lower than that produced with uncoated filaments thereby allowing the coated filaments to pull out more easily and gives the composite more toughness.

In one embodiment, the matrix is comprised of a solid state sintered ceramic, i.e. polycrystalline, phase. In another embodiment, the matrix is comprised of a mixture of the sintered phase and a phase of whiskers. Preferably, the sintered ceramic phase has an average grain size or less than about 100 microns, or less than about 50 microns, or less than about 20 microns, and most preferably less than about 10 microns.

In one embodiment, the matrix of the composite is free of elemental carbon which is detectable by scanning electron microscopy. In another embodiment, the matrix contains elemental carbon ranging from an amount detectable by scanning electron microscopy to less than about 0.1% by volume, or less than about 0.05% by volume, of the composite. Any elemental carbon present in the matrix has no significant deleterious effect on the composite.

The boron nitride coated fibrous material, preferably filaments, impart significant toughness and prevent brittle fracture of the composite at room temperature. By brittle fracture of a composite it is meant herein that the entire composite cracks apart at the plane of fracture. For example, in the embodiment utilizing spaced filaments, in contrast to a brittle fracture, this composite exhibits filament pull-out on fracture at room temperature. Specifically, as the present composite cracks open, generally at least about 10% by volume, frequently at least about 30% or 50% by volume, of the coated filaments, and preferably all of the coated filaments, pull out and do not break at the plane of fracture at room temperature.

One particular advantage of this invention is that the present composite can be produced directly in a wide range of sizes. For example, it can be as long or as thick as desired.

The present composite has a porosity of less than about 5% by volume, preferably less than about 1% by volume, of the composite. Most preferably, the composite is void- or pore-free, or has no significant porosity, or has no porosity detectable by scanning electron microscopy. Generally, any voids or pores in the composites are less than about 70 microns, preferably less than about 50 microns or less than about 10 microns, and they are distributed in the composite. Specifically, any voids or pores are sufficiently uniformly distributed throughout the composite so that they have no significant deleterious effect on its mechanical properties.

The present composite has a wide range of applications depending largely on its particular composition. For example, it is useful as a wear resistant part, acoustical part or high-temperature structural component.

As a practical matter, the present composite cannot be produced by hot pressing the coated fibrous material, preferably filaments, between layers of loose ceramic particles because during hot pressing the particles slide pushing the coated fibrous material, preferably filaments, out of alignment, and frequently, also into contact with each other.

The invention is further illustrated by the following examples where, unless otherwise stated, the procedure was as follows:

Commercially available continuous filaments of silicon carbide produced by a chemical vapor deposition process and sold under the trademark AVCO SCS-6 were used. These filaments had a 35 micron carbon core on which silicon carbide was deposited to an overall diameter of about 145 microns. The outside surface of the filaments consisted of two layers of pyrolytic carbon and carbon-silicon, with overall thickness of about 3 microns. In air at room temperature these filaments have a tensile strength of about 500 thousand psi and a tensile modulus of about 60 million psi. These filaments have an average thermal expansion coefficient of less than about $5.0 \times 10^6$ in/in-° C.

The filaments were cut to a length of about 2 inches and were coated with boron nitride by the following low pressure chemical vapor deposition process utilizing the reaction $B_3N_3H_3Cl_3 \rightarrow 3BN + 3HCl$. Specifically, the filaments were placed on a molybdenum screen which was then positioned at about the midpoint of the hot zone of a pyrex/quartz/pyrex furnace tube. A 1.00 gram sample of commercial trichloroborazine $(B_3N_3H_3Cl_3)$ was transferred in an argon-filled glove box to a pyrex end-section which contained a thermocouple vacuum gauge, a cold trap, and a vacuum stopcock. The closed pyrex end-section was then taken out of the glove box and attached to an end of the furnace tube and to a vacuum system. The end-section containing the trichloroborazine was then cooled using liquid nitrogen and the furnace tube was opened to the vacuum system via the stopcock of the pyrex end-section. After the system reached a pressure lower then 0.020 torr, the furnace was heated to about 1,050° C. When the pressure had again dropped below 0.020 torr and the furnace temperature had stabilized, the end-section containing the trichloroborazine was warmed by an oil bath maintained at 60° C., whereupon the solid began to vaporize, depositing BN and liberating gaseous HCl in the hot zone of the furnace tube and producing an increase in pressure. The pressure was observed to reach as high as about 200 torr before stabilizing at about 50 torr. After two hours, the pressure was found to have decreased to about 0.020 torr, whereupon the furnace was shut down and the system allowed to cool to room temperature before opening the tube and removing the sample. Identification of the chemically vapor deposited layer as BN was accomplished by means of electrical resistance measurement and a quantitative ESCA analysis of a film deposited in substantially the same manner on a SiC disk surface. This film was amorphous to x-rays in the as-deposited condition and appeared fully dense and smooth at high magnification in the SEM. Scanning electron microscopy observation of the ends of coated and broken filaments revealed that the coating was continuous and smooth and about 1.5 microns thick on the filament and left no significant portion of the filament exposed.

The boron nitride coated filaments were uniaxially aligned by placing them in a device for aligning filaments and maintaining the required spacing between them. This device was made from a copper foil laminated on a printed circuit board which was etched by the photolithographic technique in such a way as to produce parallel grooves about 0.006 inch diameter 0.004 inch deep and 0.008 inch apart (center-to-center). The coated filaments were placed on this device and a simple scoop of the filaments using a straight edge led to filling of each of the grooves with a filament. This resulted in a single layer of uniformly spaced coated filaments which was lifted off the board by putting adhesive tapes across each end portion of the filament layer. The adhesive tapes were sufficient to maintain the alignment and spacing between the coated filaments in the layer. Several such pre-formed layers of coated filaments were produced in which the coated filaments were substantially parallel and spaced about 100 microns from each other.

The mullite powder had an average size of about 0.7 microns.

The zircon powder had an average size of about 0.5 microns.

By ambient temperature herein it is meant room temperature, i.e. from about 15° C. to about 30° C.

The organic binding material was comprised of commercially available organic binder comprised of polyvinylbutyral (average molecular weight of about 32,000)

and commercially available liquid plasticizer comprised of polyunsaturated hydroxylated low-molecular weight organic polymers. Specifically, in Examples 1 and 2, the organic binding material was comprised of 4.86 grams of polyvinylbutyral and 9.4 grams of liquid plasticizer, and in Examples 3 and 4, it was comprised of 4.44 grams of polyvinylbutyral and 4.01 grams of liquid plasticizer.

Hot pressing was carried out in a 2-inch inner diameter, 2-inch inner length cylindrical die in an atmosphere of flowing nitrogen which was at about atmospheric pressure.

Standard techniques were used to characterize the hot pressed composite for density, microstructure and mechanical properties.

EXAMPLE 1

Mullite tapes were prepared by the tape casting technique. 14.26 grams of the organic binding material were dissolved at ambient temperature in 44 grams of a mixture of grams of toluene and 10 grams of methyl isobutyl ketone. The resulting solution was admixed with 100 grams of mullite powder in a ball mill for about 4 hours at ambient temperature. The resulting slurry was tape cast on a Mylar sheet using a doctor blade, then dried in air at room temperature and atmospheric pressure to remove the solvent, and the resulting tape was stripped from the Mylar sheet.

The tape was about 6 inches wide and had a substantially uniform thickness of about 0.012 inch. Mullite powder was distributed therein substantially uniformly.

The tape was cut to lengths of about 1.5 inches. Each of the resulting tapes contained mullite powder in an amount of about 52% by volume of the tape.

A layered sandwich-type structure was formed comprised of 7 layers of mullite tapes and 6 layers of boron nitride coated filaments wherein the coated filament layers were separated from each other by tape. The adhesive-taped portions of the coated filaments protruded from the layered structure. Before assembly, to enhance adherence, the faces of the tapes which were to be contacted with the coated filaments were sprayed with an organic solution of binder, and dried for a few seconds in air at room temperature leaving a discontinuous coating of sticky organic binder. Specifically, a solution comprised of 3 weight % of commercially available polyvinylbutyral (average molecular weight of about 32,000), 39 weight % toluene, 9.5 weight % acetone, 39 weight % xylene, and 9.5 weight % ethanol was used. The solution was sprayed on the faces of the tapes for a sufficient time so that upon evaporation of the solvent there remained about 0.2 milligrams of sticky organic binder per square centimeter of surface.

The resulting layered structure was laminated in air in a laminating press at about 93° C. under a pressure of about 1,000 psi for about 1 minute. At lamination temperature and pressure, the tapes were plastic resulting in filling of the void space between and around the coated filaments.

The laminated structure was sliced perpendicular to the filament axis into bar-shaped samples (1.25 inch×0.3 inch×0.15 inch) using a diamond saw. Examination of a cross-section showed uniform spacing between the coated filaments as well as between the layers of filaments.

The samples were placed in a vacuum oven for removing the organic binding material wherein the vacuum was typically about 20 millitorr. The burnout cycle was comprised of heating the furnace at a rate of 30° C. per hour to 500° C., a five-hour hold at 500° C. and a cooldown to room temperature at a rate of 200° C. per hour. This led to complete removal of the organic matter from the laminated structure which resulted in a porous structure comprised of mullite powder and coated filaments. No elemental carbon was detected by scanning electron microscopy.

Each of the porous bar-shaped structures was placed in a graphite die and hot-pressed at temperatures ranging from about 1,570° C. to about 1,585° C. Each sample was heated at a rate of approximately 100° C. per minute to the maximum hot pressing temperature under a pressure of 3,500 psi applied for consolidation. The consolidation was monitored by plunger displacement and complete densification occurred within 30 minutes after the onset of densification. After hot-pressing, the sample was furnace cooled to room temperature and removed from the die.

The hot pressed samples, i.e. composites, were characterized and are illustrated in Table I.

The cross-section (perpendicular to filament axis) of one of the composites (Example 1C) is shown in FIG. 1. FIG. 1 illustrates the substantially uniform spacing between the coated filaments as well as the substantially uniform spacing between layers of coated filaments. FIG. 1 also shows that each layer of coated filaments was maintained in a substantially single plane. In addition, FIG. 1 shows a fully dense mullite matrix surrounding each individual filament. The density of this composite was 3.10 g/cc, in line with fully dense mullite matrix material containing about 25 volume % filaments. No porosity was detected in the composite by microscopy. Mullite has an average thermal expansion coefficient of about $5.0 \times 10^{-6}$ in/in$-°$ C. and less than about 15% higher than that of the coated filaments.

Some of the composites were broken at room temperature in a three-point-bend configuration to determine fracture strength and load-elongation characteristics. All of the broken composites exhibited filament pullout. The results for each of three of the composites are given in Table I as Examples 1A–1C.

FIG. 2 shows a load deflection curve for the composite for Example 1C. It can be seen that this composite showed toughened ceramic-like behavior. The load-deflection curve shows the onset of matrix cracking followed by a significant rise in the load carrying capability of the composite. An ultimate load was reached beyond which the composite showed graceful failure, i.e. gradual decrease in the load on extensive failure of the composite.

For comparison, mullite powder alone was hot pressed in substantially the same manner as the sample of Example 1B to produce a body (Example 1X in Table I) of substantially the same size and density which was fractured in substantially the same manner. Its load deflection curve (broken line) is also shown in FIG. 2. It fractured in a brittle manner.

EXAMPLE 2

This example was carried out in substantially the same manner as Example 1, except as noted herein and in Table I.

The dried tape had a thickness of about 0.015 inch and contained a volume fraction of mullite powder of about 54% by volume of the tape.

A number of composites were produced and some were broken as disclosed in Example 1. All of the broken composites showed toughened ceramic-like behavior and filament pull-out. The results for one of these composites is given as Example 2A in Table I.

pull-out. The results for one of these composites is given as Example 4A in Table I.

TABLE 1

| | | Tape | | | | Composite Characteristics | | | | |
|---|---|---|---|---|---|---|---|---|---|---|
| Ex. | Matrix-forming material | Vol. % matrix-forming material | Thickness (inch) | Filament Layers in Layered Structure | Hot Pressing Temperature (°C.) | Density g/cc | Filaments Vol. % | Avg. grain size | Fracture strength (MPa) | Fracture strain (%) |
| 1A | mullite | 52 | 0.012 | 6 | 1585 | 3.09 | 25 | <5 μm | 777 | 1.21 |
| 1B | " | 52 | 0.012 | 6 | 1580 | 3.09 | 25 | " | 855 | 1.02 |
| 1C | " | 52 | 0.012 | 6 | 1570 | 3.09 | 25 | " | 646 | 0.90 |
| 1X | " | 52 | 0.012 | none | 1580 | 3.13 | 0 | " | 202 | 0.16 |
| 2A | " | 54 | 0.015 | 6 | 1575 | 3.09 | 25 | " | 750 | 1.1 |
| 3A | zircon | 53 | 0.010 | 6 | 1570 | 4.14 | 25 | " | 712 | 1.4 |
| 3B | " | 53 | 0.010 | 6 | 1560 | 4.14 | 25 | " | 657 | 1.1 |
| 3C | " | 53 | 0.010 | 6 | 1565 | 4.19 | 25 | " | 712 | 1.0 |
| 3X | " | 53 | 0.010 | none | 1570 | 4.36 | 0 | " | 215 | 0.15 |
| 4A | " | 53 | 0.012 | 6 | 1525 | 4.11 | 25 | " | 645 | 0.7 |

EXAMPLE 3

This example was carried out in substantially the same manner as Example 1, except as noted herein and in Table I. Zircon powder was used instead of mullite powder.

100 grams of zircon powder and a solution of 8.4 grams of organic binding material and 34.3 grams of a mixture of 26.4 grams toluene, 6.5 grams methyl isobutyl ketone, and 1.4 grams ethyl alcohol were used to form the slurry.

The dried tape had a thickness of bout 0.010 inch and contained a volume fraction of zircon powder of about 53% by volume of the tape.

A number of composites were produced and some were broken as disclosed in Example 1. All of the broken composites showed toughened ceramic-like behavior and filament pull-out. The results for each of three of the composites are given as Examples 3A-3C in Table I. Zircon has an average thermal expansion coefficient of less than about $5.0 \times 10^{-6}$ in/in—° C. and less than about 15% higher than that of the coated filaments.

FIG. 3 shows a load deflection curve for the composite of Example 3A. It can be seen that this composite showed toughened ceramic-like behavior. The load-deflection curve shows the onset of matrix cracking followed by a significant rise in the load carrying capability of the composite. An ultimate strength was reached beyond which the composite showed graceful failure, i.e. gradual decrease in the load on extensive failure of the composite.

For comparison, zircon powder alone was hot pressed in substantially the same manner as the sample of Example 3A to produce a body (Example 3X in Table I) of substantially the same size and density which was fractured in substantially the same manner. Its load deflection curve (broken line) is also shown in FIG. 3. It fractured in a brittle manner.

EXAMPLE 4

This example was carried out in substantially the same manner as Example 3, except as noted herein and in Table I.

The dried tape had a thickness of about 0.012 inch and contained a volume fraction of zircon powder of about 53% by volume of the tape.

A number of composites were produced substantially as disclosed in Example 3 and some were broken as disclosed in Example 1. All of the broken composites showed toughened ceramic-like behavior and filament All of the composites produced in Table I, except Examples 1X and 3X, illustrate the present invention. The present composites are useful as high temperature structural material in aircraft engines.

What is claimed is:

1. A process for making a composite containing boron nitride coated fibrous material embedded in a ceramic matrix which comprises the following steps:
   (a) forming a laminated structure comprising at least one layer of boron nitride coated fibrous material disposed between two layers of tape comprising a ceramic matrix material said matrix having a thermal expansion coefficient which is less than about 15% higher than that of the coated fibrous material, and an organic binder material;
   (b) heating the laminated structure to remove the organic binding material; and
   (c) hot pressing the resulting laminated structure at a temperature and pressure to consolidate said structure to produce a composite having a porosity of less than about 5% by volume, at least about 10% by volume of said composite being said boron nitride coated fibrous material.

2. The process according to claim 1, wherein said fibrous material is selected from the group consisting of fibers, filaments, strands, bundles, whiskers, cloth, felt, and combinations thereof.

3. The process according to claim 1, wherein in step (e) said layer of coated fibrous material is comprised of a plurality of spaced continuous filaments.

4. The process according to claim 1, wherein said fibrous material is elemental carbon.

5. The process according to claim 1, wherein said fibrous material is selected from the group consisting of aluminum oxide, elemental carbon, a silicon carbide-containing material containing at least about 50% by weight of silicon and at least about 25% by weight of carbon based on the weight of said silicon carbide-containing material, a silicon nitride-containing material containing at least about 50% by weight of silicon and at least about 25% by weight of nitrogen based on the weight of said silicon nitride-containing material, and combinations thereof.

6. The process according to claim 1, wherein said matrix-forming material is comprised of an oxide-based ceramic.

7. The process according to claim 1, wherein said matrix-forming material is comprised of particulates selected from the group consisting of aluminum oxide, mullite, zircon, silicon carbide, silicon nitride, and combinations thereof.

8. The process according to claim 1, wherein said matrix-forming material is comprised of crystalline ceramic particulates and whiskers wherein said whiskers range up to about 30% by volume of said matrix-forming material.

9. The process according to claim 1, wherein said matrix has a thermal expansion coefficient ranging from lower than that of said coated fibrous material to about the same as that of said coated fibrous material.

10. A process for making a composite containing a plurality of spaced layers of boron nitride coated fibrous material embedded in a ceramic matrix which comprises the following steps:
  (a) forming a layered strucutre comprising a plurality of layers of boron nitride coated fibrous material and a plurality of tapes comprising a ceramic matrix material and an organic binder material wherein each layer of coated fibrous material is disposed between the faces of said tapes;
  (b) heating the laminated structure to remove the organic binding material; and
  (c) hot pressing the resulting laminated structure at a temperature and pressure to consolidate said structure to produce a composite having a porosity of less than about 5% by volume, the matrix having a thermal expansion coefficient which is less than about 15% higher than that of the coated fibrous material, at least about 10% by volume of said composite being boron nitride coated fibrous material.

11. The process according to claim 10, wherein said fibrous material is selected from the group consisting of fibers, filaments, strands, bundles, whiskers, cloth, felt, and combinations thereof.

12. The process according to claim 10, wherein in step (e) said layers of coated fibrous material are comprised of a plurality of spaced continuous filaments.

13. The process according to claim 10, wherein said fibrous material is comprised of a combination of elemental carbon and silicon carbide.

14. The process according to claim 10, wherein said fibrous material is selected from the group consisting of aluminum oxide, elemental carbon, a silicon carbidecontaining material containing at least about 50% by weight of silicon and at least about 25% by weight of carbon based on the weight of said silicon carbide-containing material, a silicon nitride-containing material containing at least about 50% by weight of silicon and at least about 25% by weight of nitrogen based on the weight of said silicon nitride-containing material, and combinations thereof.

15. The process according to claim 10, wherein said fibrous material is a carbon-containing material.

16. The process according to claim 10, wherein said matrix-forming material is comprised of an oxide-based ceramic.

17. The process according to claim 10, wherein said matrix-forming material is comprised of particulates selected from the group consisting of aluminum oxide, mullite, zircon, silicon carbide, silicon nitride, and combinations thereof.

18. The process according to claim 10, wherein said matrix-forming material is comprised of crystalline ceramic particulates and whiskers wherein said whiskers range up to about 30% by volume of said matrix-forming material.

19. The process according to claim 10 wherein said matrix has a thermal expansion coefficient ranging from lower than that of said coated fibrous material to about the same as that of said coated fibrous material.

* * * * *